US 6,606,030 B2

(12) United States Patent
Vena

(10) Patent No.: US 6,606,030 B2
(45) Date of Patent: Aug. 12, 2003

(54) PET WIRELESS DOORBELL DEVICE AND TRAINER

(76) Inventor: Anthony Vena, 33 Picardy Pl., Southampton, NJ (US) 08088

( * ) Notice: Subject to any disclaimer, the term of this patent is extended or adjusted under 35 U.S.C. 154(b) by 0 days.

(21) Appl. No.: 09/782,871

(22) Filed: Feb. 14, 2001

(65) Prior Publication Data

US 2002/0003479 A1 Jan. 10, 2002

Related U.S. Application Data

(60) Provisional application No. 60/182,331, filed on Feb. 14, 2000.

(51) Int. Cl.[7] .................................................. G08B 23/00
(52) U.S. Cl. ............................... 340/573.3; 340/573.1; 340/328; 340/330; 340/286.11; 340/665; 340/666; 119/174

(58) Field of Search .......................... 340/573.3, 573.1, 340/328, 330, 286.11, 665, 666, 539; 119/174

(56) References Cited

U.S. PATENT DOCUMENTS

| 4,686,504 | A | * | 8/1987 | German | 340/328 |
|---|---|---|---|---|---|
| 5,303,677 | A | * | 4/1994 | Jones | 119/174 |
| 5,952,926 | A | * | 9/1999 | Syverson | 340/573.3 |
| 6,094,139 | A | * | 7/2000 | Moore | 340/573.1 |

* cited by examiner

Primary Examiner—Daniel J. Wu
Assistant Examiner—Tai T. Nguyen
(74) Attorney, Agent, or Firm—Donald C. Simpson

(57) ABSTRACT

A pet training device designed to alert a pet owner that his/her pet would like to enter or exit the home.

2 Claims, 14 Drawing Sheets

US 6,606,030 B2

PET WIRELESS DOORBELL DEVICE AND TRAINER

RELATED PATENT APPLICATIONS

This patent application is based in part on subject matter contained in Provisional Patent Application No. 60/182,331 of the same inventor, which was filed Feb. 14, 2000, the benefit of which filing date is claimed herein.

This invention relates to pet training devices designed to alert a pet owner that his/her pet would like to enter or exit the home.

BACKGROUND OF THE INVENTION

There have been a great many patents issued for inventions designed to signal the pet owner when his/her pet wants to come inside or go outside their home, including older patents such as U.S. Pat. No. 1,118,283 to R. H. Holdefer and U.S. Pat. No. 2,655,122 to F. M. Adams Oct.13, 1953 and more recent patents such as U.S. Pat. No. 5,475,369 to Baker, U.S. Pat. No. 5,604,478 to Grady, and U.S. Pat. No. 5,952,926 to Syverson. Despite the obvious desire by pet owners for such a device, they have not achieved significant commercial success and it is difficult to find a place to purchase such devices. It appears the these past inventions inadequately address the needs of specific pets and specific pet owners but instead attempt to produce a single design product for all pets irrespective of size or character of the animal with the result that the devices tend to misfire and/or the pet is unable to consistently strike, push, scratch or whatever to produce the desired signal. In particular, the existing devices appear to be designed primarily for larger dogs but do not function equally effectively for cats and small or toy dogs. For example, the specific examples shown for the more recent prior art all describe a vertical activating surface in which the pet must reach upward and "swipe" at the surface with a paw or push on it with its nose. A cat's nose is surrounded by extremely sensitive whiskers which it uses to "sense" or feel the world around it. Most cats carefully avoid use of the nose and whiskers as anything other than sensory organs; seldom if ever will a cat be observed using the nose/whiskers part of its body as a pushing tool. Cats and small dogs have no hesitation, however, to step forward or push something at or below head level with a paw.

The Baker patent states in broad terms that the claimed device can be used in a horizontal position but provides no specifics for a horizontal adaptation. Attempts to utilize a device of the Baker type have shown that the Baker device is not readily adapted to the horizontal usage and is not suitable for most cats and small dogs.

SUMMARY OF THE INVENTION

The present invention has been specifically designed for indoor/outdoor cats and small dogs, such as the toy dog breed, and to be free of misfires when used by such pets. In essence, the present invention is an improvement in the Baker device so as to permit its ready use in the horizontal position. The complete device comprises a light, sturdy housing, a wireless signal transmitter having an extended signal button, one or more wireless receivers, and appropriate mounting means for the various parts. Rather than a vertical activating surface, the device is provided with a horizontal activating surface which can be readily operated through the use of an extended paw with the weight of the animal behind it to insure that misfires are avoided and the signal is transmitted effectively. The signal then activates the wireless signaling device such as a bell or chime which can be heard inside and outside the home simultaneously.

A significant feature of the present invention is a training device which can be used in conjunction with the signaling device but which can be removed once the pet is adequately trained to the regular use of the signaling device. The pet owner uses the pet's favorite food or treat in a removal and detachable receptacle to train the pet to depress the signal button lever. The sound of the signal which the animal hears relates the opening of the door to the pets favorite treat. When this procedure is repeated in several training sessions, the pet will have been programmed into a "habit". The more times the pet successfully rings the bell promptly followed by the opening of the door, and the treat, the more the habit is enforced. Once the "habit" is created, the pet will associate the sound of the door chimes, the opening of the door and the dinner that it receives all as one unit. In other words, the sound, the door opening and the treat or dinner become inseparable within the mind of the pet. Later, it will not be necessary to give the pet a treat each time it comes inside.

BRIEF DESCRIPTION OF THE DRAWINGS

FIG. 11 provides a perspective view of this embodiment, whereas FIGS. 12, 13, and 14 respectively provide a front view, right side view, and top view of this preferred commercial embodiment.

The following Table of Parts relates the part names and the corresponding numbers in the drawings.

TABLE OF PARTS

Figure 1A:
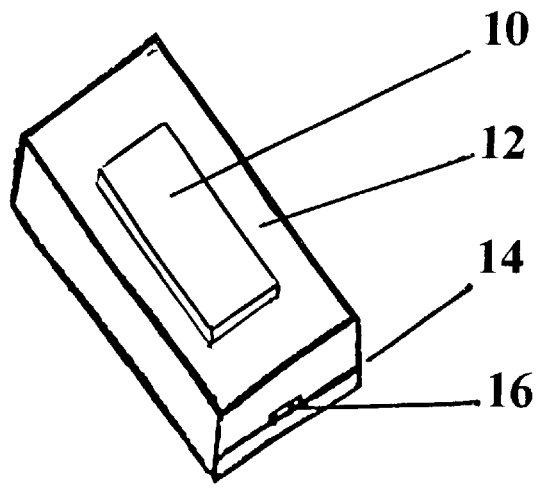
FIGS. 1A through 1C illustrate three views of the wireless transmitter activating button in which 1A illustrates the extended bell button activating surface and the notch for opening the housing to change the battery, 1B illustrates the detachable housing base with clip, and 1C provides an inside view to illustrate the battery and other components.
Figure 1B:
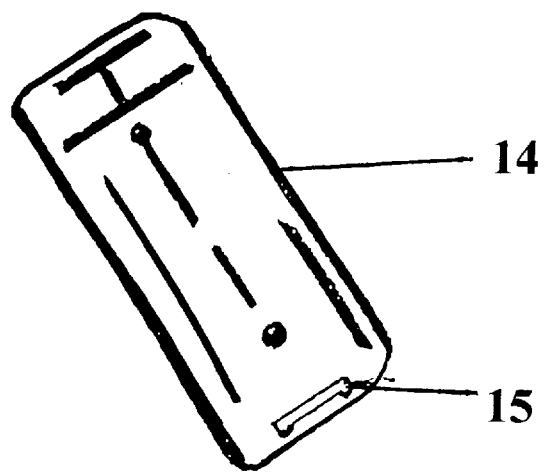
Figure 2:
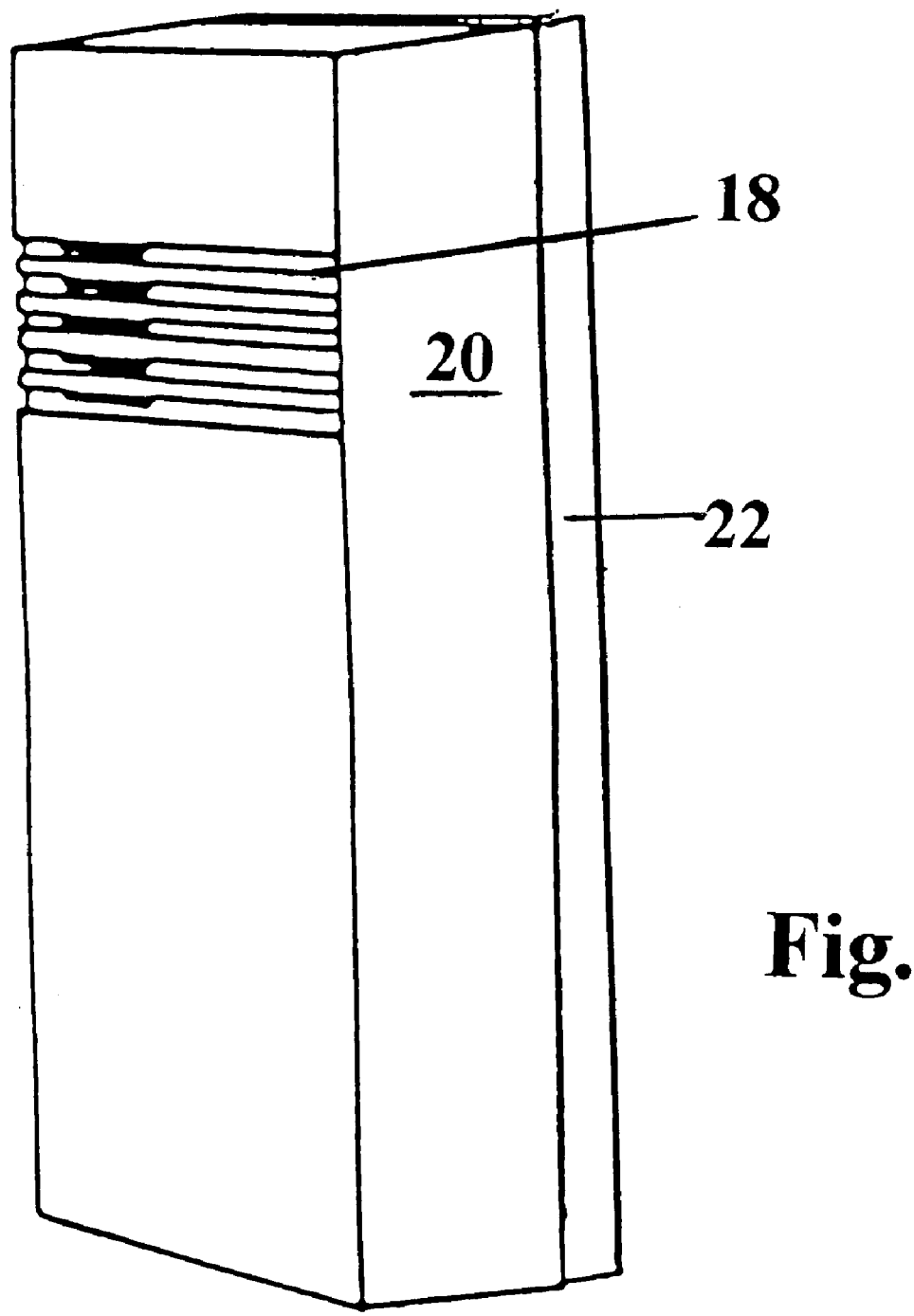
FIG. 2 illustrates the front view and side view of wireless receiver.
Figure 3:
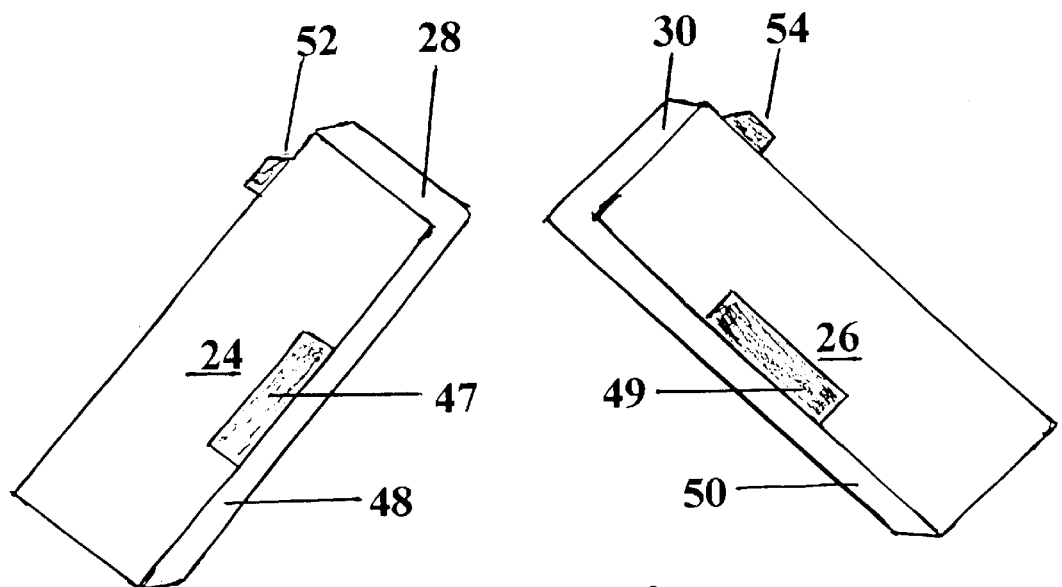
FIG. 3 provides a perspective view of two rectangular side sections.
Figure 4:
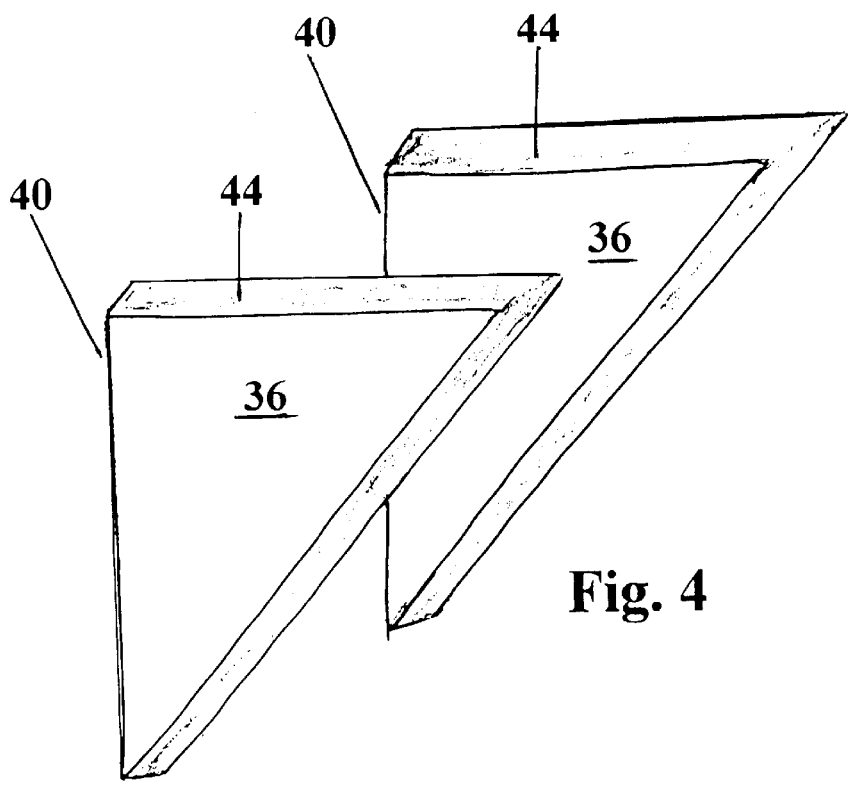
FIG. 4 provides a perspective view of two triangular side sections.
Figure 5:
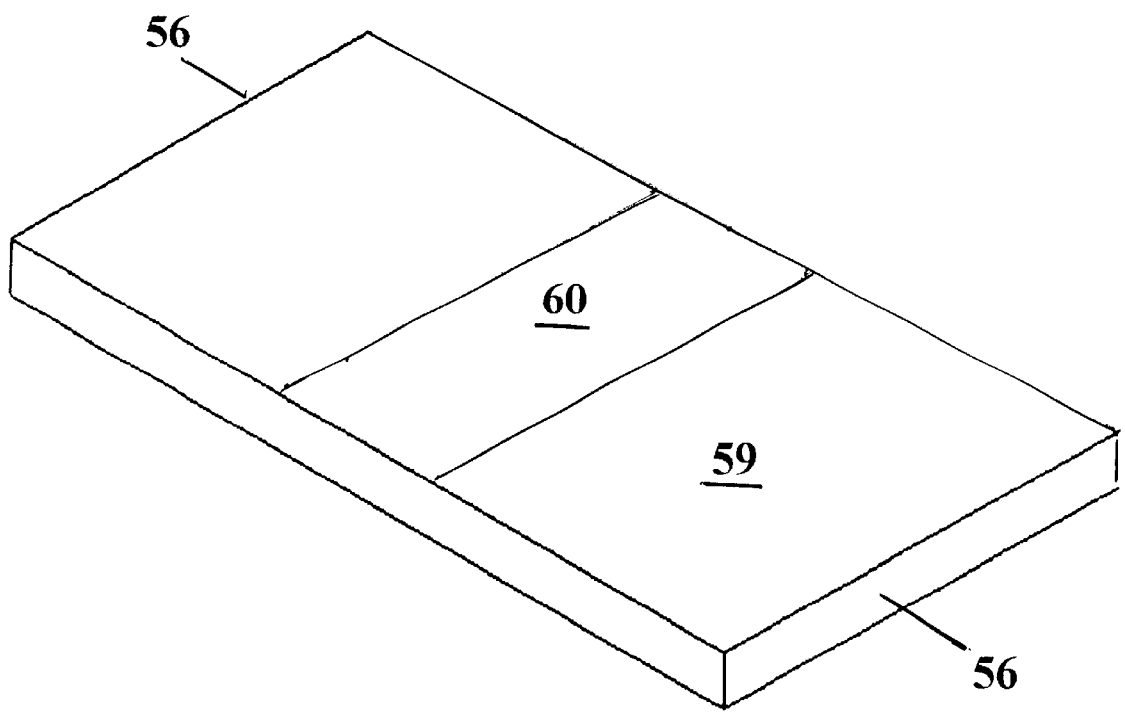
FIG. 5 illustrates a rectangular transmitter base and the designated area where the wireless transmitter will be placed.
Figure 6A:
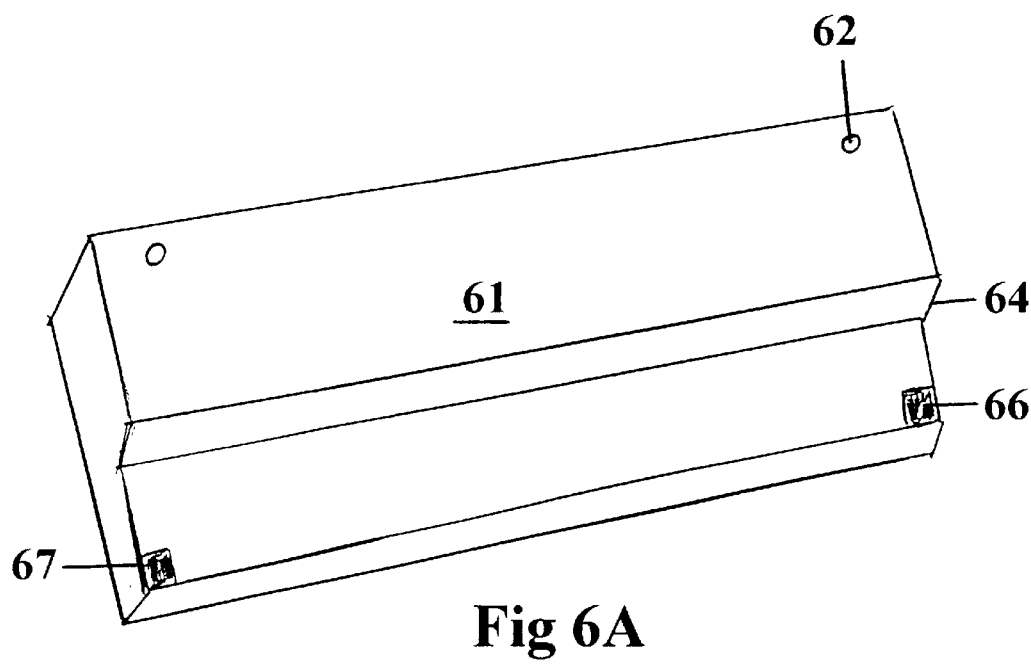
FIGS. 6A–6B provide perspective views of the back support and illustrate optional mounting screw holes, a hole for the removable training receptacle, and a groove where bell button lever tucks under for resistance.
Figure 7A:
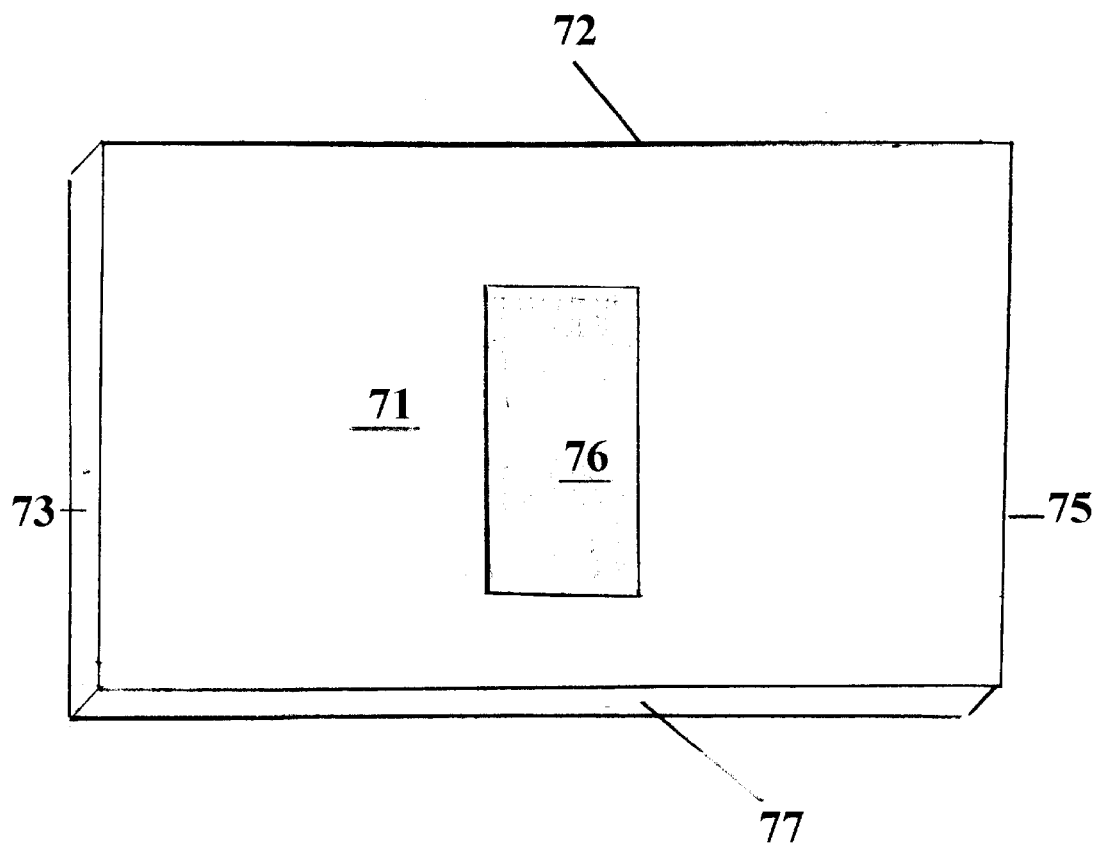
FIG. 7A is a plan view of the bell button lever.
Figure 7B:
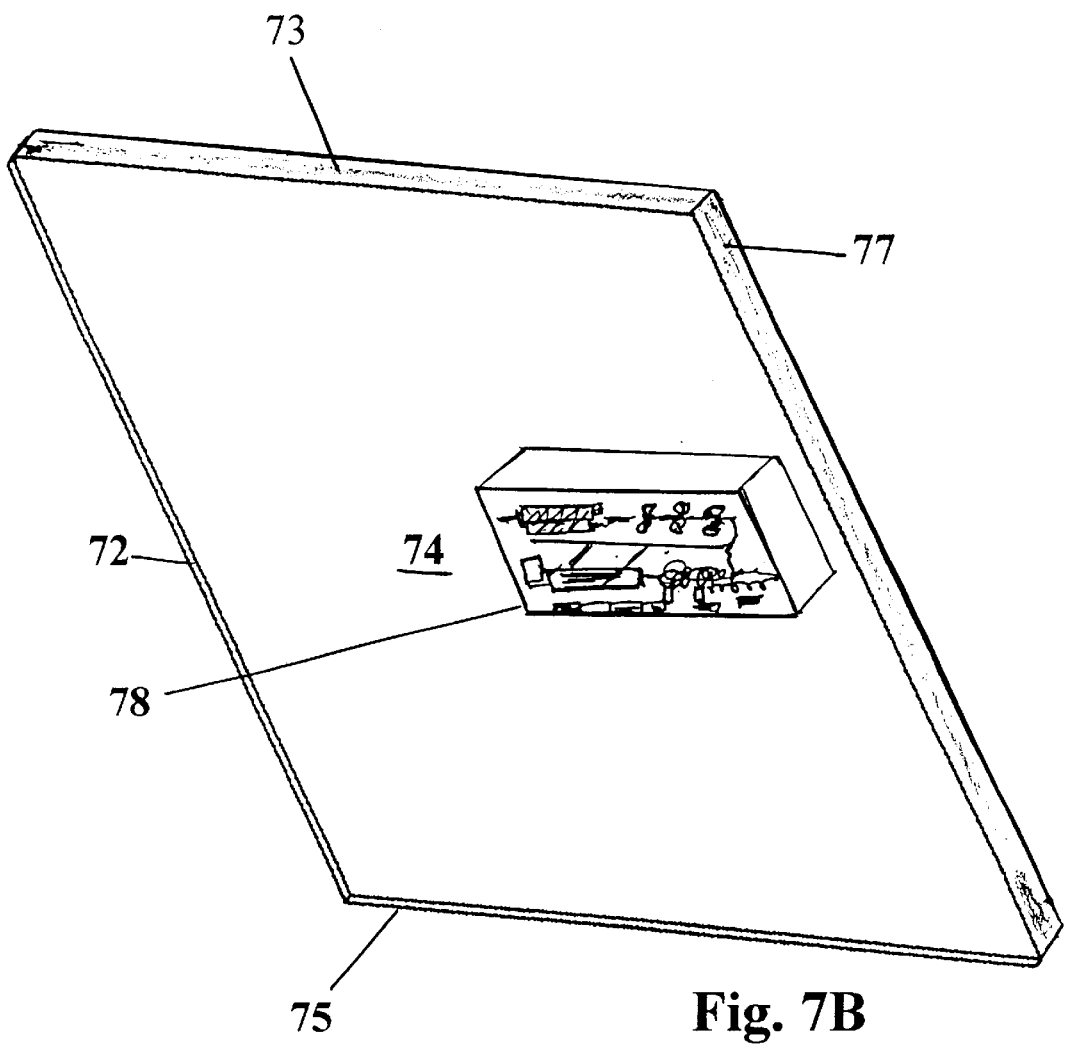
FIG. 7B illustrates the underside of the bell button lever, with the wireless transmitter without it's housing base secured to the lever.
Figure 7C:
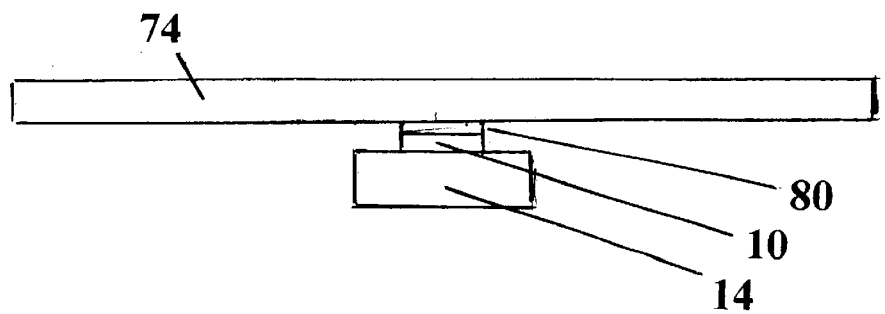
FIG. 7C. illustrates a side of the bell button lever with wireless transmitter attached underneath.

| # | Description | # | Description |
|---|---|---|---|
| #10 | Elongated Bell Button | #56 | Two areas, one on each end of Transmitter Base to be cemented to another part. |
| #12 | Wireless Transmitter (FIG. 1A) | | |
| #13 | Inside view of the Wireless Transmitter. | #59 | Wireless Transmitter Base (FIG. 5) |
| #14 | Detachable housing base of Transmitter. (FIG. 1B) | #60 | Color coded or marked out where Wireless Transmitter will be secured. |
| #15 | Plastic clip to snap close the housing unit. | #61 | Main Housing Back Support (FIG. 6A). |
| #16 | Small opening where screw driver is used to open housing for service. | #62 | Predrilled screw holes for optional wall mounting. |
| #18 | Audio Sound vent. | #64 | Groove of lip along front of Main Housing Back Support. |
| #20 | Wireless Receiver (FIG. 2) | | |
| #22 | Detachable housing base for changing battery or other service. | #66 | Color coded or marked out area on right side of Main Housing Back Support to be cemented to another part. (see FIG. 6A). |
| #24 | Left Housing Support (FIG. 3) | | |
| #26 | Right Housing Support (FIG. 3) | | |
| #28 | Area on left Housing Support to be cemented to another part. | #67 | Color coded or marked out area on left side of Main Housing Back Support to be cemented to another part. (see FIG. 6A). |
| #30 | Area on right Housing Support to be cemented to another part. | | |
| #36 | Two identical Mounting Supports (FIG. 4). | #68 | Hole to insert the Removal Training Receptacle. |
| | | #70 | Rear part of the Main Housing Back Support. |
| #40 | Rear of Mounting Support that rest against wall when mounting device. | #71 | Lever without Wireless Transmitter attached (FIG. 7A) |
| #44 | Area on top of Mounting Support to be cemented to another part. | #72 | Rear part of Lever. |
| | | #73 | Left side of Lever. |
| #47 | Left side: color coded or marked out area cemented to another part. (See FIG. 3) | #74 | Bell Button Lever (FIG. 7B) |
| | | #75 | Right side of Lever. |
| #48 | Area under left side to be cemented to another part. (See FIG. 3) | #76 | Color coded or marked area where Wireless Transmitter will be secured. |
| #49 | Right side: color coded or marked out are cemented to another part. (See FIG. 3) | #77 | Front side of Bell Button Lever. |
| | | #78 | Underside view of the Wireless Transmitter without housing base. |
| #50 | Area under right side to be cemented to another part. (See FIG. 3) | #80 | Double face tape. |
| #52 | Raised notch on left side near the end of this part. (See FIG. 3) | #86 | Training Receptacle (FIG. 8) |
| | | #88 | Stem of Removable Training Receptacle can be adjusted for height. |
| #54 | Raised notch on right side near the end of this part. (See FIG. 3) | | |

DESCRIPTION OF THE PREFERRED EMBODIMENTS

Figure 1C:
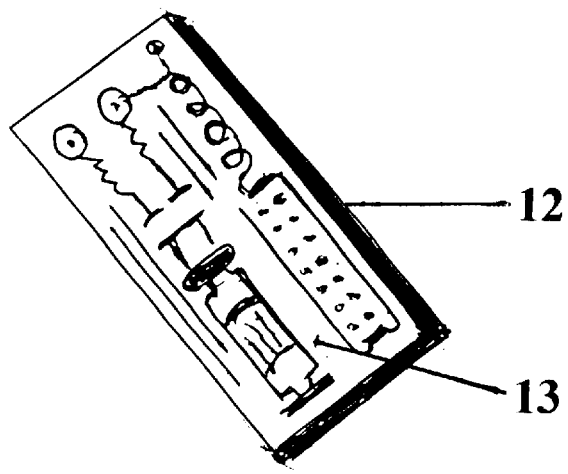

The present invention comprises (10) major parts with corresponding part numbers as show in the drawing as follows: Wireless Transmitter 12 (See FIGS. 1A–1B–1C), Wireless Receiver 20 (See FIG. 2), left and right Housing Supports, 24 and 26 (See FIG. 3), two Mounting Supports 36 (See FIG. 4), Transmitter Base 59 (See FIG. 5), Main Housing Back Support 61 (See FIG. 6A), Bell Button Lever 74 (See FIG. 7A), and Removable Training Receptacle 86 (See FIG. 8).

There are certain features of the present invention that serve to distinguish it from the Baker device and make it particularly adaptable for use in a horizontal position for cats and small dogs. Of particular significance is the location of the signal-triggering device, i.e., the bell button relative to the transmitter-activating component shown as Lid 1 in Baker. Because Baker designed his device to be operated in a vertical position, the transmitter was located in a compartment close to the pivot point of his Lid 1. This left excessive space between the Lid and the actuating button of the transmitter requiring that Baker add a "dimple" 12 as part of Lid 1 to ensure that appropriate contact would be made to actuate the transmitter upon pressure being applied to Lid 1. In the device of the present invention, the transmitter with its actuating button is positioned toward the front of the actuating "Lid" or lever, away from the pivot point, and beyond its center of gravity such that the lever is essentially supported by the pivot at one end and the transmitter button at the other end. The lever is made from a material light enough to rest on the transmitter button without compressing the internal button spring of the transmitter sufficiently to activate the transmitter. When a force applied to the level sufficient to compress the spring in the transmitter and activate the transmitter is removed, the internal spring of the transmitter will return the button with lever resting thereon to its unactuated position.

Another component of the present invention of considerable importance, and which distinguishes it from Baker, is found in the back end of Baker's Lid 1. Because Baker designed his advice to be used principally in the vertical position, it was necessary to provide the lid with a Wall 18 to protect the inner workings against the elements. This wall was provided as a specific element of movable Lid 1 and moved with the lid as the lid was actuated. As a result, the Baker device can be operated in a horizontal position only by setting it down on a surface which puts it at far too low a level for effective operation and makes no allowances for the different sizes of pets. A low positioning of the device can easily lead to accidental actuation in the normal course of a pet moving around in that area. By positioning the device at a higher level where the pet can be trained to reach up deliberately to actuate it, this problem of accidental actuation can be avoided. In Baker, this is possible only by placing the Baker device on bricks or other platforms, or on legs, and all of these alternatives are difficult to anchor against sliding or other types of movement. In the present invention, the device is provided with a firm back for mounting to a vertical surface, such as a wall or door that is immovable relative to the actuating lever. The pet owner can adjust the height of mounting at will, according to the needs of the particular pet.

Still another advantage of the present invention, not found in Baker, is the introduction of an optional training device. While Baker refers to the need to train a pet to use his device, he does not disclose a method for doing so, and the design does not readily adapt itself to the addition of a training device. The fixed vertical back of the present device is readily adapted to provide a training device to help the pet owner teach the pet to use the device of the present invention.

Assembly Instructions Using Drawings and Parts List

Except for the Wireless Transmitter 12 and the Wireless Receiver 20, all parts are preferably made of plastic or acrylic material. Lever 71 should be clear acrylic for reasons explained below.

Step No. 1. Start by taking the Left and Right Housing Supports, parts 24 and 26 respectively and place them apart from each other. The left on the left side the right on the right side with the Raised Notch, 52 and 54 to the rear. Also, the Left Side color coded area 47 will be facing the Right Side color coded area 49. (See FIG. 3)

Step No. 2. Take the Wireless Transmitter Base 59 (See FIG. 5) and be certain that the Color Coded Area 60 is facing up and by using clear acrylic cement, applied with an acrylic applicator or a similar household cement, secure one side Area 56 to the Left Side Color Coded area 47 and the other Area 56 to the Right Side Color Coded area 49.

Figure 9:
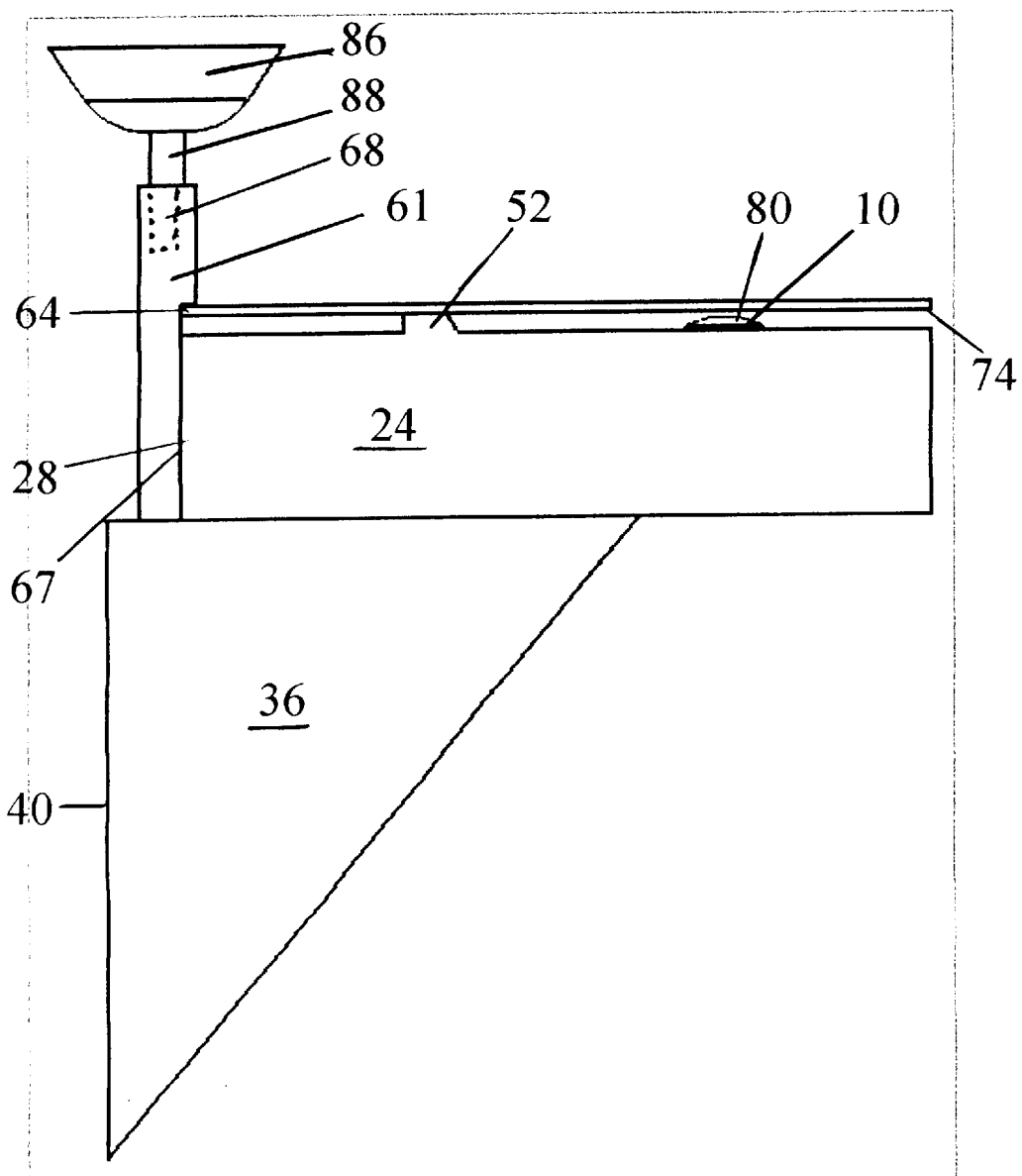
FIG. 9 provides a perspective left side view of the complete device with all the parts attached. This view also illustrates how the triangular side sections would both protrude slightly beyond the housing back support for added mounting support.

Step No 3. Take the Main Housing Back Support 61 (See FIG. 6A) and cement this part behind the Left and Right Housing Supports 24 and 26 with the Color Coded Areas 67 facing the Area 28 and the Color Coded Area 66 facing the Area 30. FIG. 9 shows a left side view of the device completely assembled with 67 secured to 28, under the Groove or Lip 64.

Figure 10:
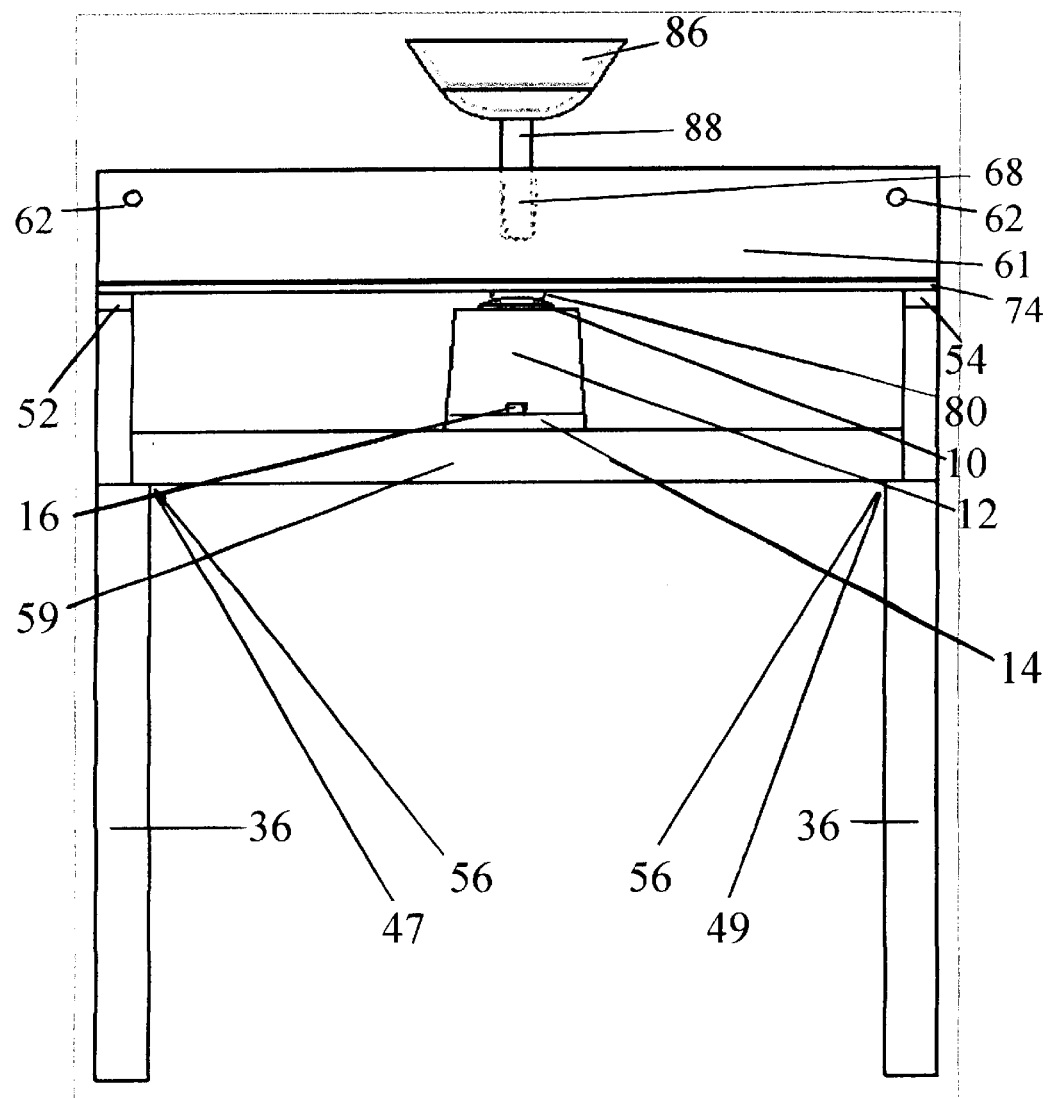
FIG. 10 provides a perspective front view of the completed assembled device.
Figure 11:
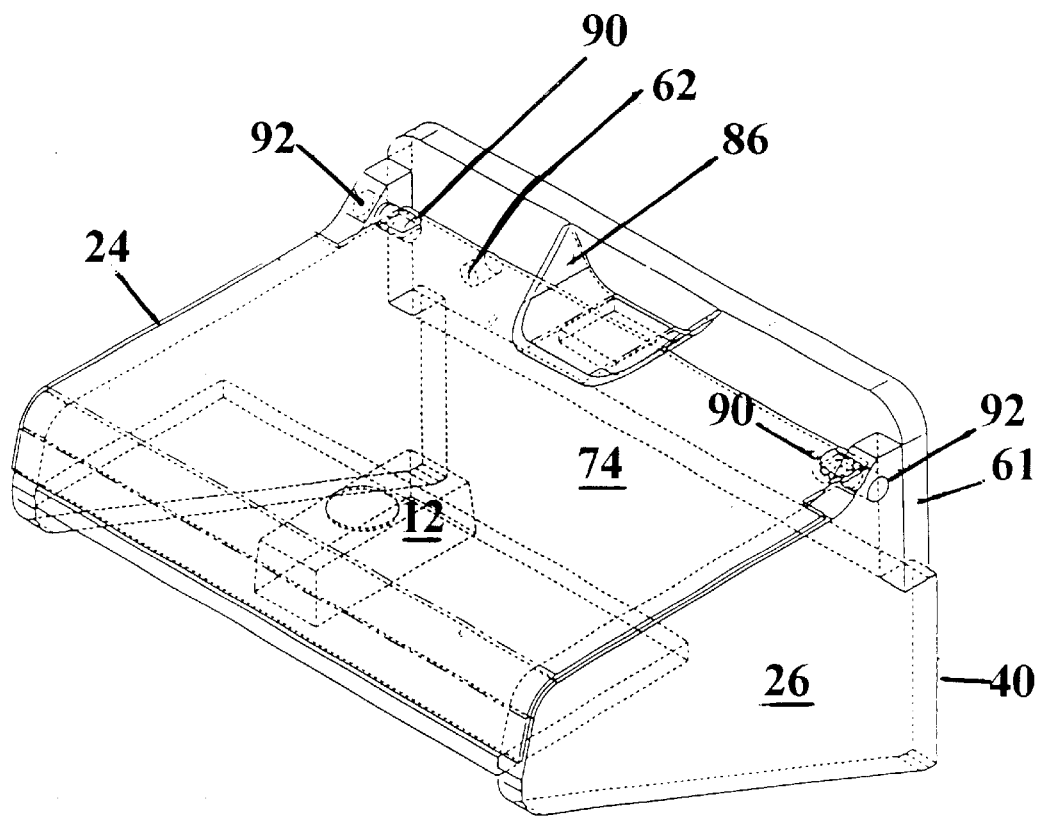
FIGS. 11 through 14 illustrate four views of an embodiment of the present invention that is present particularly adapted for and preferred for commercial production.
Figure 12:
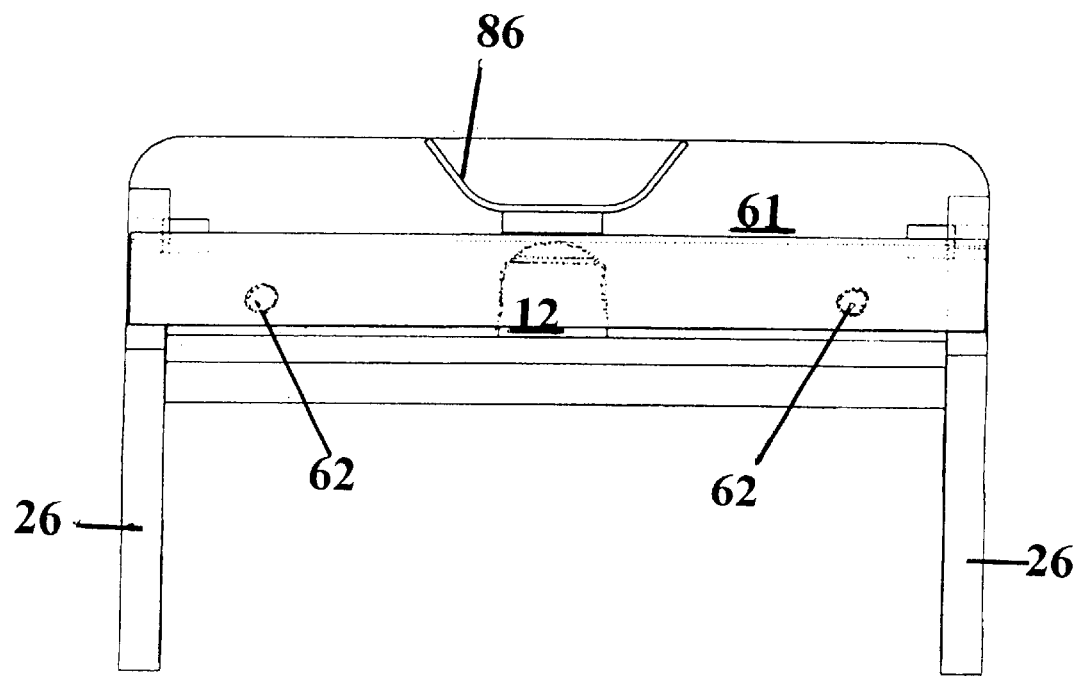
Figure 13:
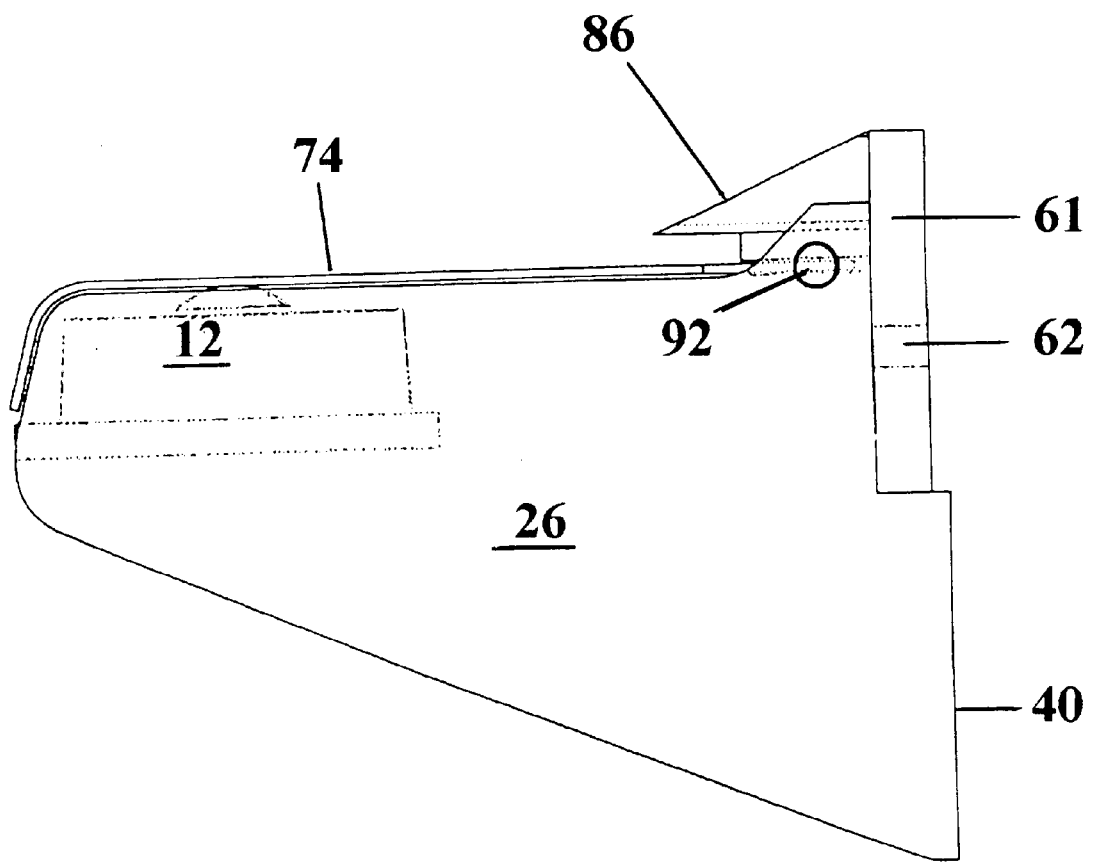
Figure 14:
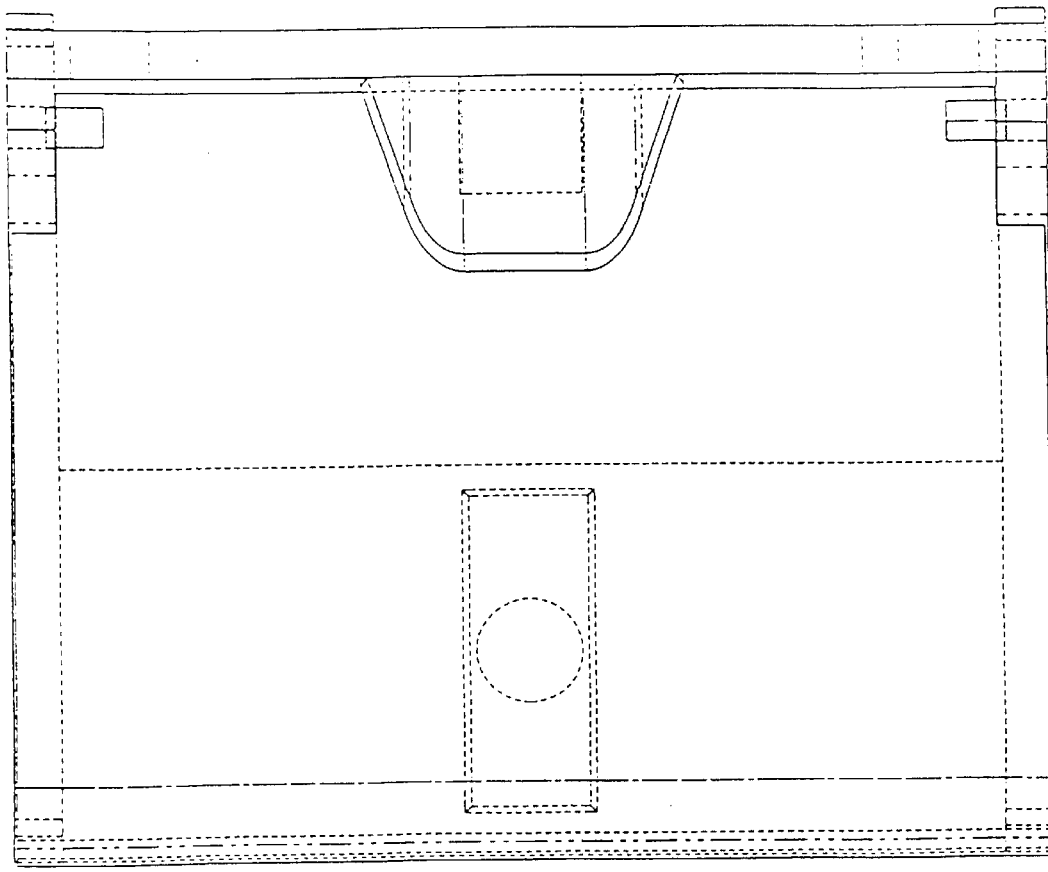

Step No 4. Wireless Transmitter 12 (See FIG. 1A), is secured to the Wireless Transmitter Base 59 on the Color Coded Area 60. As shown in FIG. 10, the Wireless Transmitter is positioned with the Small Opening 16 facing the front.

Step No 5. If it is desired to secure Lever 71 to the top of the Elongated Bell Button 10, a piece of double face tape can be secured to the Bell Button at this time.

Step No. 6. The Rear Part 72 of Lever 71 is next inserted against the Main Housing Back Support 61 and under the Groove or Lip 64 as far back as it will go without contacting the tape on top of the Elongated Bell Button until Lever 71 is lined up properly. The Color Coded Area 76 is then pressed directly over the Elongated Bell Button 10 which has been prepared with the strip of double face tape to receive the Lever 71. This combination of Lever 71 secured to the Wireless Transmitter 12 produces the Bell Button Lever 74.

Step No 7. The two identical Mounting Supports 36 (see FIG. 4) are next cemented to the underside of the Left and Right Housing Supports 24 and 26. Area Part 44 is secured to Left Side 48 and the other Area Part 44 is secured to Right Side 50. As is shown in FIG. 9, the Mounting Support protrudes slightly beyond the Main Housing Back Support 61. Since two of the mounting options would be the use of Velcro or Double Face Tape adhered to the Back of the Back Support, this would allow for the thickest of the material so that when mounted to the wall it will be flush.

Figure 6B:
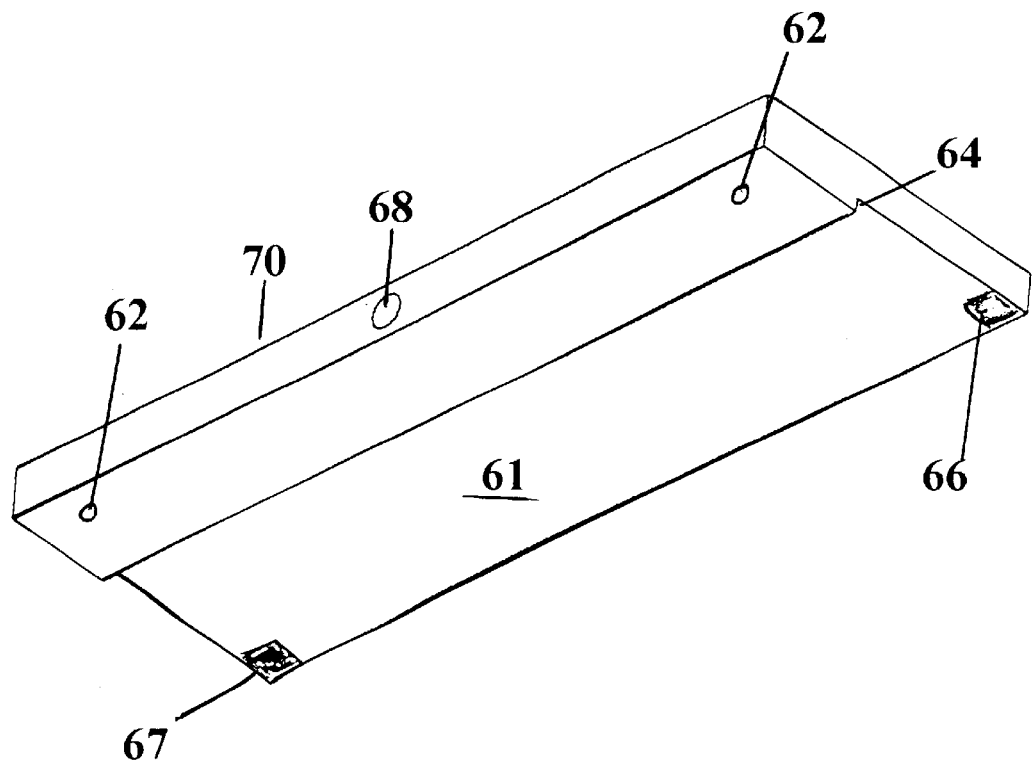

The assembled device may now be mounted outside the house on either side of the door that the pet will uses to exit and enter. It is not necessary to mount on the door unless that is the only place available. The Removable Training Receptacle (See FIG. 8) with the adjustable stem for height 88 can, if desired, be inserted into the Hole 68 on the top of the Main Housing Back Support 61 as shown. (See FIG. 6B.)

For the most effective and successful use of the Pet Doorbell Training Device, two identical Wireless Receivers are used, one near the unit for the pet to hear and the other inside the home at a location for ease of hearing by the pet owner. The outside unit may be placed above the door or where it is protected from direct contact with rain or snow or inside in close proximity to the base unit.

This training device, as compared to most prior art devices, requires no pets scratching on doors or sitting on a mat, no alluring scent, no mercury switches, no holes or defacing the front door, no springs, washers, hinges, electrical wires or counter balancing parts, and no metal parts at all that would eventually rust or need replacement or repair. The Pet Wireless Doorbell Training Device can be made from light sturdy plastic material. It can be mounted adjacent to the door usually used by the pet by using velcro, self adhesive plastic hooks, etc. and the height of the device may be adjusted as needed. The wireless transmitter has a range of about 100 feet, so the pet owner can place the wireless receiver just about anywhere in the average size home.

When the device is completely assembled, the housing is essentially one piece. The Wireless Transmitter and the Wireless Receivers are manufactured products which can be purchased from one of many companies that make and sell them. The transmitter has it's own housing and is made of plastic and it has a small 12-volt alkaline battery inside. Batteries typically last about a year. The housing is weatherproof for outdoor use which is essential since the wireless transmitter will be housed within this invention and used outdoors. Also, these wireless transmitters can be purchased with a round bell button nipple or the extended bell button nipple. Using double face sticky tape, (Scotch Brand is excellent) the bottom of the Wireless Transmitter Unit can, if desired, be fastened to the center of the Rectangular Transmitter Base to create one large Bell Button. The spring inside the Wireless Transmitter can thus be the only spring in the entire device. That spring will help to make contact to sound the chime and it will also push the Bell Button Lever back up to the normal position when the pet is not pressing on the Bell Button Lever.

It is very important that the material used for the extended Bell Button Lever be rigid but not too heavy, otherwise the pressure from the weight could activate the contacts inside the Wireless Transmitter and the chimes or bell would ring continually. On the other hand, if the material used is too thin or flexible, it would bend at some point away from the bell button and would not activate the contacts in the Wireless Transmitter.

With the present invention, your pet can have access to and strike the Bell Button Lever from the front, the right and or the left. All these three sides of the lever are free floating except the back part of the Bell Button Lever, which was inserted in the groove that is a part of the housing or Back Support Section. Since the material used is rigid and it is arrested under the groove, it will act as a resistance to the rear of the Bell Button Lever and it will not pop up and or rock. Since the Bell Button Lever is not resting directly on the side sections, there is some spacing between the underside of the entire perimeter of Bell Button Lever, except for the part under the groove to the top part of side sections. The spacing between these parts is also critical to the efficiency necessary for the device to work perfectly every time the pet leaps up on the Bell Button Lever.

The concave Training Receptacle is placed in a slot or hole at the top of the Back Support section. This receptacle can be removed after the pet is trained or it may be left in place. When the device is place at the correct height from the ground, the pet should not be able to see if there is food in the Training Receptacle unless it goes up on top of the Bell Button Lever with it's front paws. That is when the pet activates the chimes.

The unit should be mounted high enough so the pet cannot see if there is food in the Training Receptacle without stepping up on the extended bell button. Also, the weight of the animal's front torso combined with the impact of downward striking motion on the Bell Button Lever magnifies the impact and will always trigger the contacts inside the wireless transmitter sending a signal to the wireless receivers. It is necessary for the pet to hear the signal and also the pet owner. Ideally, there are two or more receivers, one inside and one outside. The outside receiver, although weather proof or weather resistant, should be protected from direct contact with rain or snow.

There are four basic mounting options:

(a) the device can be permanently mounted in place with screws;

(b) double faced tape can be used to adhere to the rear of the Back Support;

(c) Velcro may be used, which gives the option to remove the device periodically to clean or adjust the height from time to time; or (d) back hooks. The back underside of the Back Support is designed for this purpose. This method of mounting is of particular use inside the home since the pet owner may remove the unit easily at those times when the owner doesn't want the pet to go out.

In any of these mounting methods, the side supports, as part of the housing, naturally press against the wall and will take all the weight and pressure off the upper housing when a pet presses on the Bell Button Lever.

The foregoing embodiment is particularly adapted to hand construction and assembly. The embodiment of FIGS. 11 through 14 is particularly adapted for commercial production using common commercial plastic-forming apparatus, injection molding, and the like. The most significant change is found in the replacement of the groove or Lip 64 (FIG. 9) by the Projecting Cylindrical Pivots 90 fixed to each side of the rear of Lever 74, which, in turn, extend into and pivot in Pivot Seats 92 in Sides 24 and 26 (see FIGS. 11 through 14). As shown in FIGS. 11 through 14, the front edge of Lever 74 is somewhat extended and curved downward to provide further protection from the weather for the transmitter.

Figure 8:
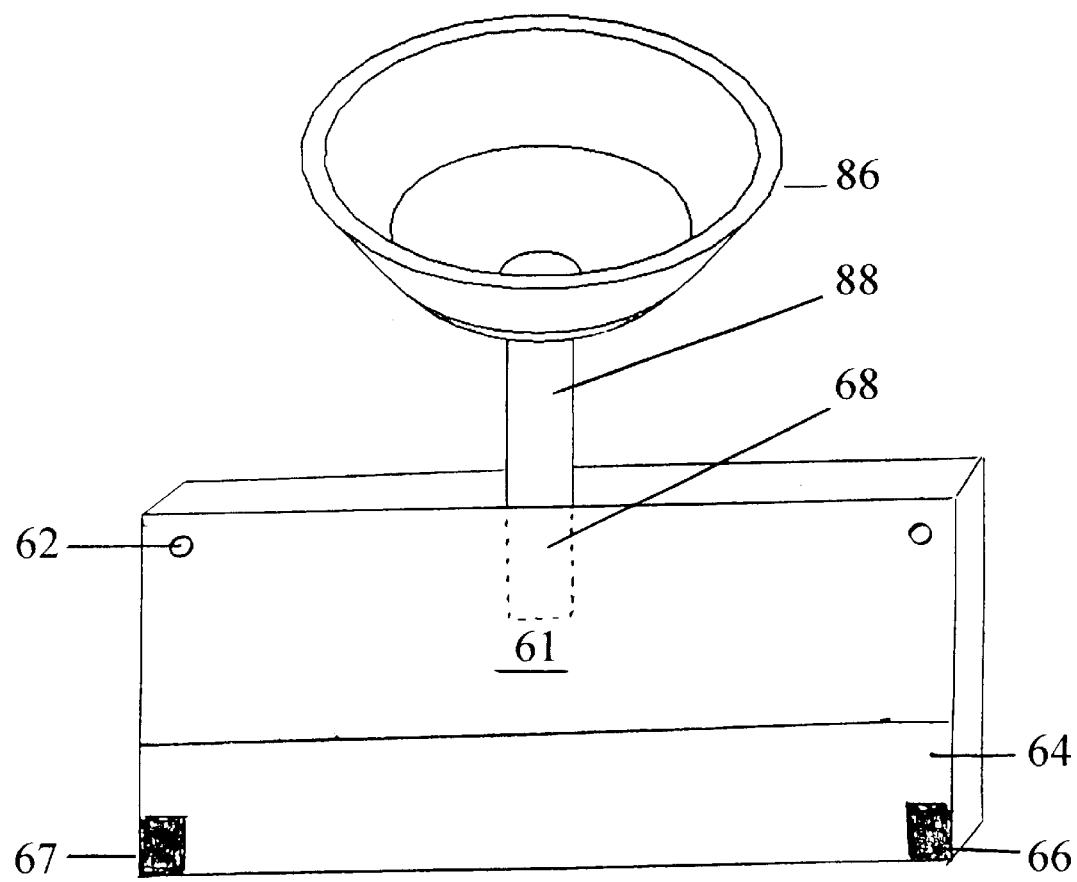
FIG. 8 illustrates the removable training receptacle inserted into the top of the back support. The back support is a front view, also illustrating where the left and right rectangular side sections would be secured.

The only other change of substance other than the readily apparent design characteristics, is the use of an optionally permanent or a removable training receptacle 86 (compare FIGS. 8 through 10 with FIGS. 11 through 14 in this regard).

The important consideration with regard to the feeding tray is that it be in a position such that the contents will not be readily apparent to the pet without the pet raising itself up somewhat by stepping on the actuating lever; this forms an important part of the training of the pet. In the case of the first embodiment shown, that can be controlled somewhat by the height of the training receptacle, but with regard to both embodiments, it can be controlled by simply regulating the height of the overall unit when it is installed in its normal operating position.

What is claimed is:

1. An animal actuated signaling unit comprising a wireless transnmitter, a companion wireless receiver, and a housing means, said housing means comprising a horizontal base portion and a generally horizontal actuating lever portion movable toward and away from said horizontal base portion, the improvement which comprises a vertical back portion rigidly fixed to said horizontal base portion and adapted to be affixed to a vertical wall, said generally horizontal actuating lever portion pivotably connected to said housing means adjacent to the surface of said vertical rear wall, said wireless transmitter mounted to said horizontal base portion at a distance from said pivotable connection beyond the center of gravity of said generally horizontal actuating lever with the undersurface of said geneally horizontal actuating lever resting on the actuating button of said wireless transmitter without actuation of said button until an external pressure is put on the upper surface of said generally horizontal actuating lever.

2. An improved device in accordance with claim 1 in which said vertical rear wall additionally has affixed thereto a training receptacle.

* * * * *